United States Patent
Patapoutian et al.

(10) Patent No.: US 6,587,291 B2
(45) Date of Patent: Jul. 1, 2003

(54) ASYNCHRONOUSLY SAMPLING WIDE BI-PHASE CODES

(75) Inventors: Ara Patapoutian, Westborough, MA (US); Peter McEwen, Santa Clara, CA (US); Eduardo Veiga, Sunnyvale, CA (US); Bruce D. Buch, Westboro, MA (US)

(73) Assignee: Maxtor Corporation, Longmont, CO (US)

(*) Notice: Subject to any disclaimer, the term of this patent is extended or adjusted under 35 U.S.C. 154(b) by 80 days.

(21) Appl. No.: 09/850,610

(22) Filed: May 7, 2001

(65) Prior Publication Data

US 2002/0163748 A1 Nov. 7, 2002

(51) Int. Cl.[7] .................................................. G11B 5/09
(52) U.S. Cl. .............................. 360/32; 360/51; 360/42; 360/77.08; 360/78.14; 360/49; 341/70; 375/361; 375/370
(58) Field of Search ............................ 341/70; 375/354, 375/355, 361, 370; 360/51, 32, 46, 39, 40, 42, 77.08, 78.14, 48, 49

(56) References Cited

U.S. PATENT DOCUMENTS

| | | | |
|---|---|---|---|
| 4,920,442 A | 4/1990 | Dimmick | |
| 5,005,089 A | 4/1991 | Thanos et al. | |
| 5,084,791 A | 1/1992 | Thanos et al. | |
| 5,341,249 A | 8/1994 | Abbott et al. | |
| 5,384,671 A | 1/1995 | Fisher | |
| 5,521,945 A | 5/1996 | Knudson | |
| 5,661,760 A | 8/1997 | Patapoutian et al. | |
| 5,818,659 A | 10/1998 | Cheung et al. | |
| 5,862,005 A | 1/1999 | Leis et al. | |
| 6,111,710 A | 8/2000 | Feyh et al. | |
| 6,111,712 A | 8/2000 | Vishakhadatta et al. | |
| 6,185,174 B1 * | 2/2001 | Belser ................... 369/124.01 |

FOREIGN PATENT DOCUMENTS

| | | |
|---|---|---|
| WO | WO 98/16040 | 4/1998 |
| WO | WO 99/60566 | 11/1999 |

* cited by examiner

Primary Examiner—Alan T. Faber
(74) Attorney, Agent, or Firm—David M. Sigmond

(57) ABSTRACT

Sampling data with wide bi-phase code symbols includes sampling a wide bi-phase code symbol in the data a number (N) of times to produce samples of data, selecting a subset of the samples, determining which sample in the subset of samples has a largest magnitude, and selecting a subset of samples in a subsequent wide bi-phase code symbol based on a sample in a previous subset that has the largest magnitude.

37 Claims, 5 Drawing Sheets

ASYNCHRONOUSLY SAMPLING WIDE BI-PHASE CODES

TECHNICAL FIELD

This invention relates generally to sampling data that includes wide bi-phase code symbols and, more particularly, to a disk drive that asynchronously samples information, such as burst correction values (BCVs) and servo information, stored as wide bi-phase code symbols.

BACKGROUND

A data storage disk in a disk drive contains data tracks and radial spokes (also called "wedges"). The data tracks contain substantive information and the spokes contain servo information and burst data. The spokes are used in positioning a transducer head on the disk.

More specifically, by reading the servo information and burst data recorded within the spokes, a disk drive head positioner servo system is able to estimate the position of the drive's data transducer head. The recorded servo information typically includes track (i.e., cylinder and head) addresses. Each circumferential data track on a disk surface has a unique track address, which is recorded in the spokes. The servo burst data are recorded on the disk for use in positioning the transducer head properly on a track.

Thus, when a disk drive is seeking to a radial track location, the track addresses are used as coarse positioning information to position the transducer head on a specific track. The servo bursts are used as fine positioning information to position the head at a desired radial location within the track specified by the servo information.

SUMMARY

In general, in one aspect, the invention is directed to sampling data with wide bi-phase code symbols. This aspect of the invention includes sampling a wide bi-phase code symbol in the data a number (N) of times to produce samples of data, selecting a subset of the samples, determining which sample in the subset of samples has a largest magnitude, and selecting a subset of samples in a subsequent wide bi-phase code symbol based on a sample in a previous subset that has the largest magnitude.

By sampling a first wide bi-phase code symbol and selecting samples in a subsequent wide bi-phase code symbol based on the previous sample, the invention facilitates asynchronous sampling, reducing the need for feedback loops and the like to provide timing.

This aspect may include one or more of the following features. The largest magnitude may correspond to a peak in the wide bi-phase code symbol. The subset of samples may include three samples. Determining which sample in the subset of samples has the largest magnitude may include identifying if a middle sample of the three samples has the largest magnitude. If the middle sample does not have the largest magnitude, the process may include moving in the data an equivalent of N±1 samples and sampling the subsequent wide bi-phase code symbol starting at a location corresponding to the equivalent of the N±1 samples.

The data may include servo information on a storage disk. The servo information may identify a track on the storage disk. The data may include burst correction values stored on a storage disk. A burst correction value is an offset used in positioning a reading device on a track of the storage disk. Wide bi-phase code is a code in which a zero is represented by data values comprising "++−−" and a one is represented by data values comprising "−−++". The value of N may be greater than four, e.g., eight.

The details of one or more embodiments of the invention are set forth in the accompanying drawings and the description below. Other features and advantages of the invention will be apparent from the following description, drawings and claims.

DETAILED DESCRIPTION

Figure 1:
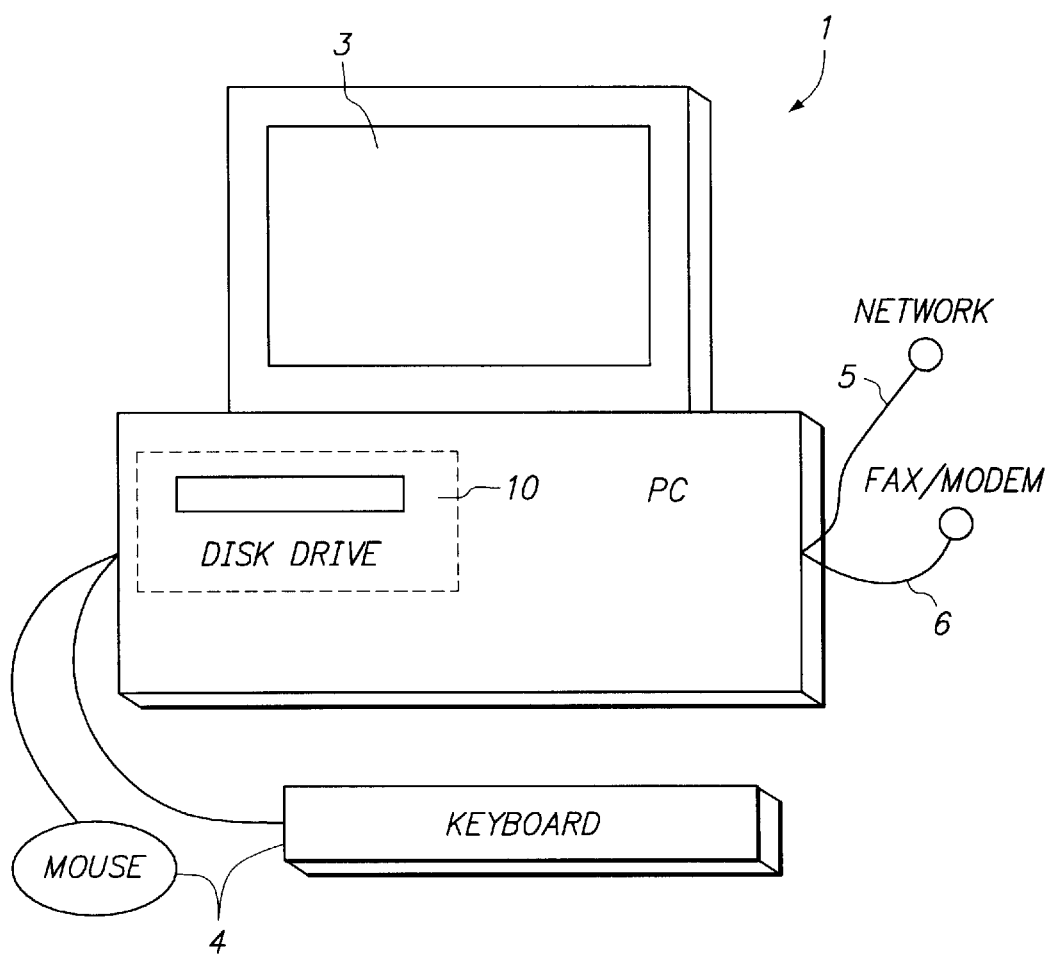
FIG. 1 shows a computer that includes a disk drive.

FIG. 1 shows a personal computer (PC) 1. PC 1 includes a disk drive 10, a display screen 3, which displays information to a user, and input devices 4 which input data. Network interface 5 and fax/modem interface 6 are also provided which connect PC 1 to a network (not shown).

Figure 2:
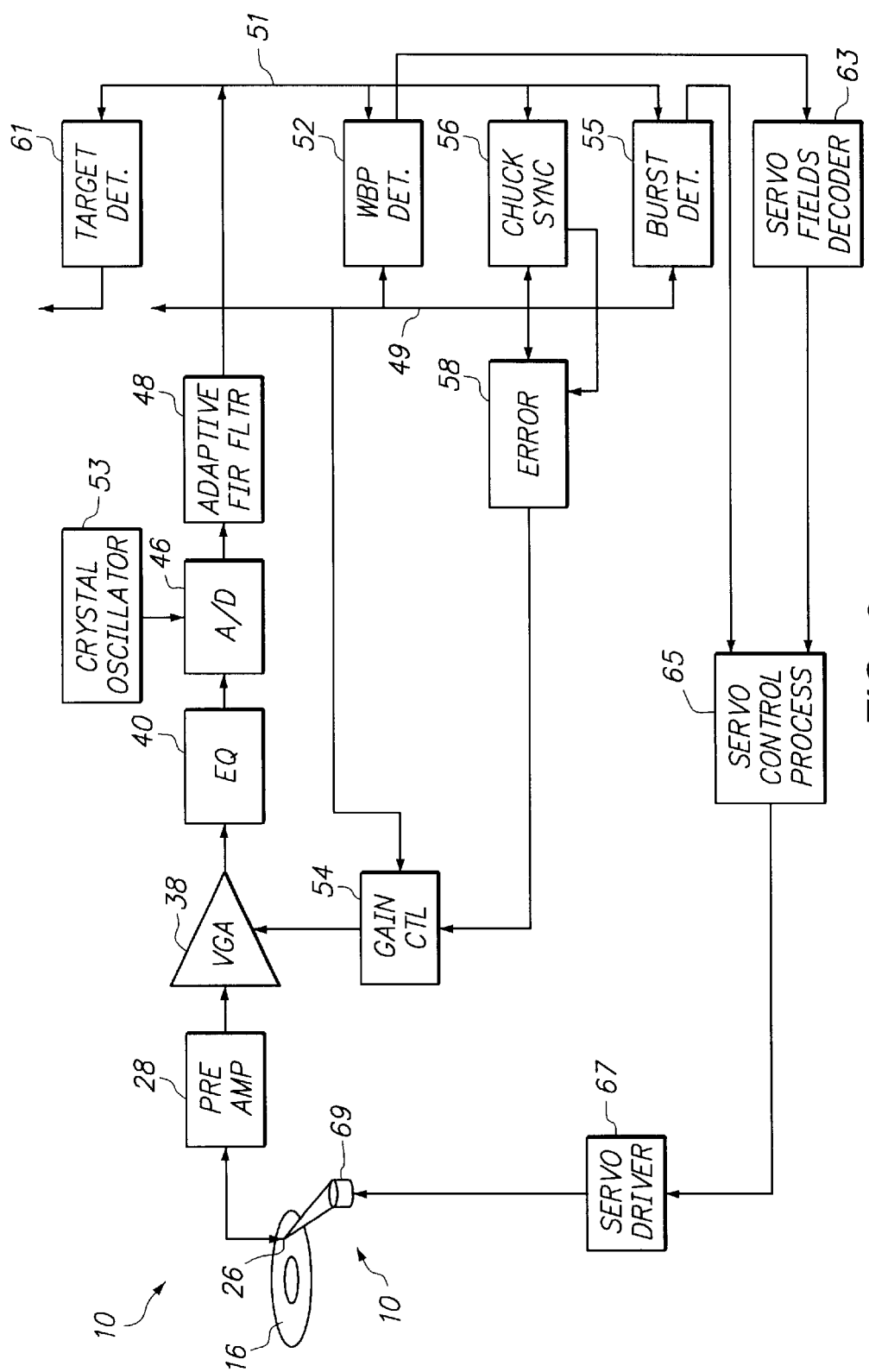
FIG. 2 shows components that make up the disk drive.

Referring to FIG. 2, disk drive 10 incorporates a programmable and adaptive maximum-likelihood (ML), e.g. PR4, read channel. Disk drive 10 may be one of a variety of disks drives, an example of which is described in commonly assigned U.S. Pat. No. 5,341,249 (Abbott et al.), entitled "Disk Drive Using PRML Class IV Sampling Data Detection With Digital Adaptive Equalization", the contents of which are hereby incorporated by reference into this application.

Disk drive 10 includes at least one data storage disk 16. A data transducer (i.e., read) head 26, such as a giant magneto-resistive head, is associated in a "flying" relationship over a storage surface of disk 16. Head 26 is positioned relative to selected ones of a multiplicity of concentric data storage tracks 71, defined on each storage surface of rotating disk 16 (see FIG. 3).

Embedded servo patterns are written during drive manufacture on selected data storage tracks of disk 16. During reading, flux transitions sensed by head 26 as it flies in close proximity over selected data tracks 71 are preamplified by a read preamplifier circuit 28. The resulting preamplified analog signal (or "read signal") is sent to an analog variable gain amplifier (VGA) 38. After controlled amplification by VGA 38, the read signal is passed through a programmable analog filter/equalizer stage 40.

Figure 3:
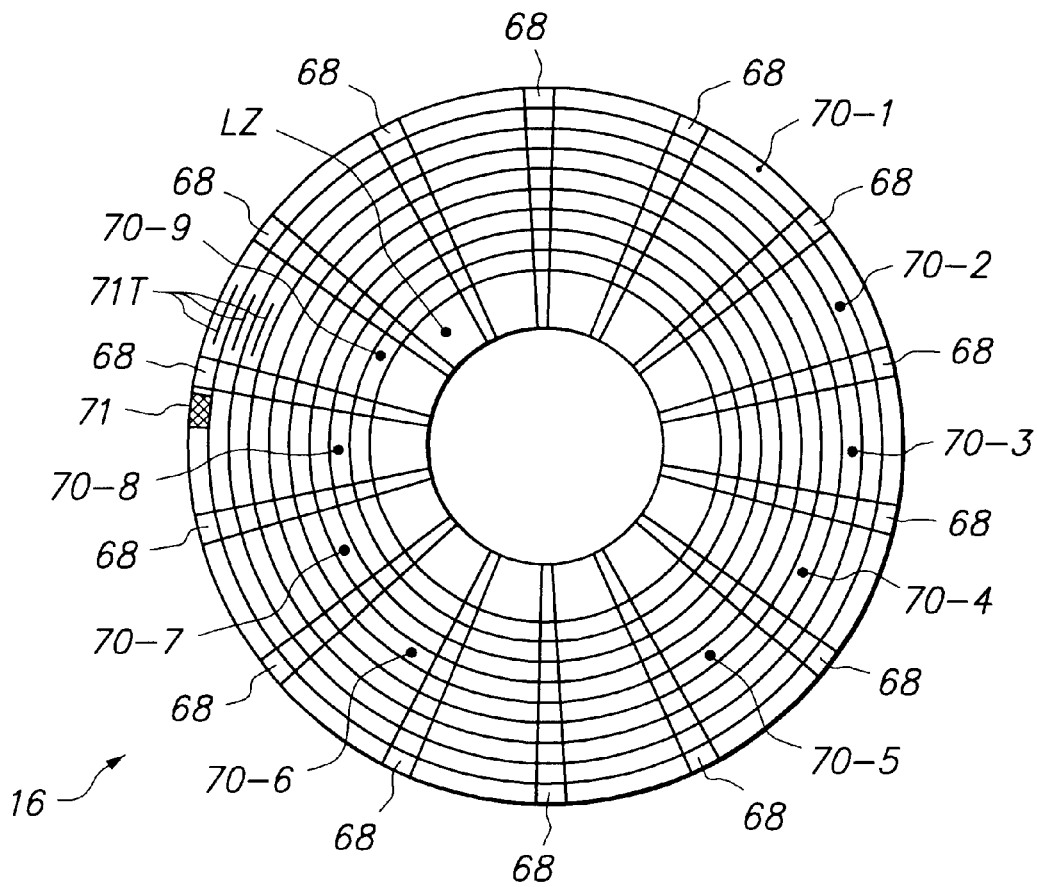
FIG. 3 shows a data storage disk in the disk drive.

Analog filter/equalizer 40 is programmed so that it is optimized for the data transfer rate of a selected data zone, e.g., 70-1 in FIG. 3, from which transducer head 26 reads data. The resulting equalized analog read signal is subjected to sampling and quantization by a high-speed analog-to-digital (A/D) converter 46. When synchronized with user data, A/D converter 46 generates raw data samples {x(k)} of at least five bits resolution in this embodiment. Crystal oscillator 53 provides a timing signal to A/D converter 46.

An adaptive finite impulse response (FIR) filter 48 employs adaptive filter coefficients for filtering and conditioning the raw data samples {x(k)} in accordance with desired PR4 channel response characteristics in order to produce filtered and conditioned samples {y(k)}. The bandpass filtered and conditioned data samples {y(k)} from FIR filter 48 are passed over a data bus path 49 to a Viterbi detector (not shown), which detects data with the PR4 target. In those embodiments using both PR4 and EPR4 targets, the filtered and conditioned samples {y(k)} from FIR filter 48 are also passed through another filter (not shown), the output path 51 of which provides the signal filtered to, e.g., EPR4 channel response characteristics.

The samples, including raw data samples {x(k)} and filtered samples, are taken at the data sampling rate, which has a clock bit time period T. This time T corresponds to a bit cell, or more simply a "cell", at the sampling rate. A gain loop 54 may control VGA 38 based, e.g., on different error values produced by an error measurement circuit 58, connected to receive the e.g., PR4 target samples on path 49. A DC offset control loop (not shown in FIG. 2) may also be provided to adjust for DC offset based on the PR4 target samples. A target detector 61 is also included. Target detector 61 may include a path memory, such as a Viterbi detector, or a complexity-reduced target pre-processor of the type described in commonly-assigned U.S. Pat. No. 5,521,945 (Knudsen), entitled "Reduced Complexity EPR4 Post-Processor For Sampled Data Detection", the contents of which are hereby incorporated by reference into this application.

Disk drive 10 also includes wide bi-phase detector 52 for detecting wide bi-phase encoded servo information symbols in accordance with framing patterns generated by a chunk synchronizer 56. Detector 52, which may be a controller or the like, receives servo symbol sample values on path 49 or path 51. Position error signals (PES) from burst detector 55 and servo field information from decoder 63 enter a servo control process circuit (controller) 65, in which actuator current values are generated. These values are applied to a head position servo driver circuit 67 and resultant driving currents are applied to drive a voice coil motor (VCM) 69 that positions head 26.

Some or all of elements 38, 40, 46, 48, 52, 53, 54, 55, 56, 58 and 63 may be included in one mixed-mode application-specific integrated circuit (ASIC), in several analog/digital ASICs, and as computer-executable instructions (e.g., software) operating within a microprocessor.

As shown in FIG. 3, an exemplary data storage surface of storage disk 16 has multiple concentric data tracks 71, which are preferably arranged in a plurality of data recording zones 70 between an inner landing zone area LZ and a radially outermost peripheral data track zone 70-1. In the illustrated example, the data tracks are shown as arranged into, e.g., nine data zones including the outermost zone 70-1, and radially inward zones 70-2, 70-3, 70-4, 70-5, 70-6, 70-7, 70-8, and 70-9, for example.

FIG. 3 also depicts a series of radially extended embedded spokes 68 which, e.g., are substantially equally spaced around the circumference of disk 16. While FIG. 3 shows the servo spokes 68 as generally trapezoidal, in practice the servo wedges are slightly curved.

Figure 4:
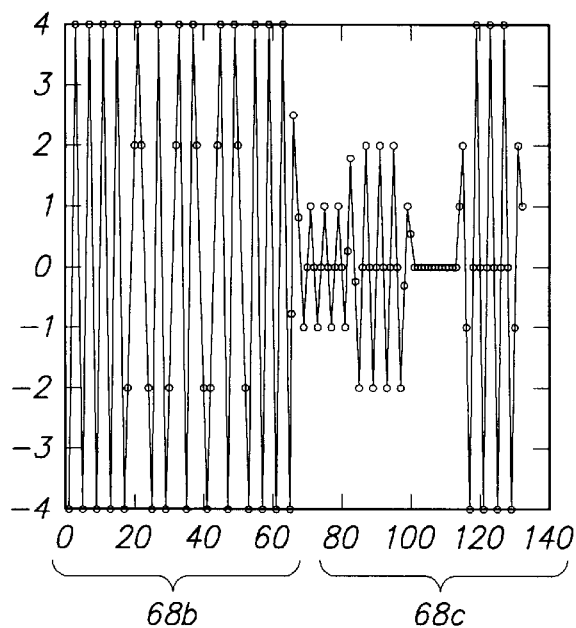
FIG. 4 is a graph showing a signal recorded on a servo sector of the data storage disk.

By way of the FIG. 4 overview, each servo sector 68 includes a servo identification field 68B and a field 68C of circumferentially staggered, radially offset servo bursts, for example. While the number of data sectors per track varies from data zone to data zone, the number of embedded servo sectors remains substantially constant throughout the surface area of the disk 16.

The servo sectors 68 are preferably recorded at a single data cell rate and with phase coherency from track to track using a conventional servo writing apparatus at manufacture. Servo writing may be conventionally carried out by a laser servo writer and head arm fixture as described, for example, in commonly assigned U.S. Pat. No. 4,920,442, the disclosure of which is incorporated herein by reference.

Alternatively, the servo sectors are written at zoned data cell rates, as described in commonly assigned U.S. Pat. No. 5,384,671. The disk drive may alternatively employ partial or complete "self servo write" techniques in order to carry out servo writing.

Figure 5:
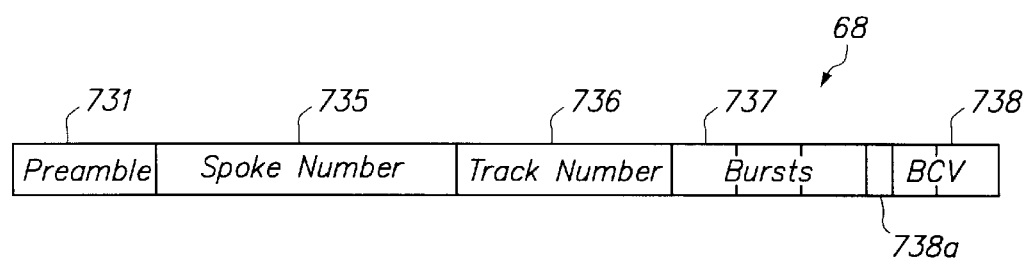
FIG. 5 shows data in the servo sector.

Turning to FIG. 5, each servo sector 68 or "spoke" has a servo identification field of embedded servo information such as is illustrated, for example. A relatively short preamble (e.g., four bits) 731, or other type of time synchronization data, is included on a clean area on the disk 16 with substantially no or a few transitions. This time synchronization data can be used to flag the onset of a servo sector 68, as noted below.

The time synchronization data is followed by full spoke number field 735 and track number field 736. The head number (not shown) may also be recorded as part of the servo addressing information. Together, full spoke number field 735 and track number field 736 comprise the servo identification field 68B of FIG. 4.

Following the addressing information, servo bursts 737 are recorded, which are used to determine head position with respect to the center of track. The patterns in field 737 correlate to the field 68C of FIG. 4. The lengths of some or all the fields of the servo section 68 may be of programmable size. Other fields of information may be of programmable size. The drive may also record servo BCVs in a short field 738 located immediately after the last servo burst pattern 737. Servo BCVs define offsets that are used in positioning the reading head on a track of the storage disk. That is, the servo BCVs define how much away from the center the track servo bursts are located. The reading head is positioned to account for this offset. Servo BCVs may include their own preamble 738a, which plays a similar role to preamble 731 (described above) for the BCV data.

We turn now to describe wide bi-phase (WBP) encoding, which may be used for some or all of the digital data storing fields of servo section 68, spoke number field 735, and track number field 736, for example. In writing digital data, one begins with an unencoded bit (that is, either a 0 or a 1), which is referred to as a symbol. Symbols are recorded on a disk by a coding technique that assigns one or more signs or magnets (+or −) to a symbol. (Somewhat ambiguously, the signs may also be referred to as being either 0 or 1.) In bi-phase code (a self-clocking code also known in the art as Manchester, frequency doubling, or frequency modulation code) two signs are used, and symbols may be encoded as follows:

1→+−

0→−+

We define a wide bi-phase (WBP) code, with code rate ¼, as follows:

0→++−−

1→−−++

Figure 6:
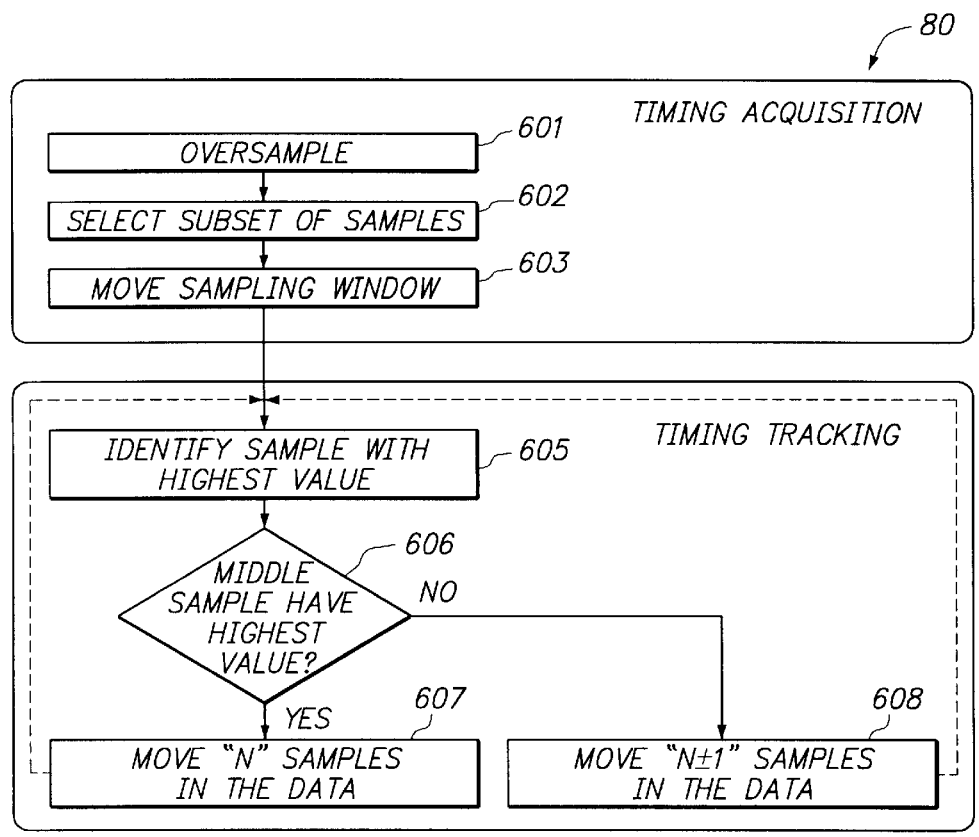
FIG. 6 is a flowchart of a process for asynchronously sampling the data in the servo sector.

FIG. 6 shows a process 80 for asynchronously sampling wide bi-phase code symbols in the disk drive of FIG. 2. Process 80 is performed by WBP detector block 52 to obtain the proper phase for head 26 to sample servo or BCV data from data storage disk 16. By obtaining the sampling phase using process 80, the need for lengthy timing data in the servo information and BCV fields is reduced. Thus, less timing data is required on the data storage disk, thereby decreasing the size of the spokes and increasing the amount of substantive data that can be stored on data storage disk 16.

Figure 7:
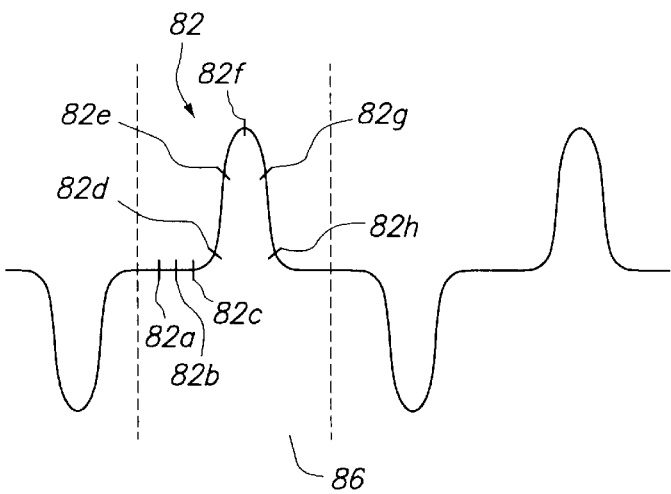
FIG. 7 is a graph showing data sampled according to the process of FIG. 6.

Referring to FIG. 6, process 80 asynchronously over-samples (601) each wide bi-phase symbol in data received from adaptive FIR filter 48 using the framing patterns provided by chunk synch 56. In this context, over-sampling means to sample each wide bi-phase symbol more than four times. However, in this embodiment, process 80 samples each wide bi-phase symbol eight times. Samples 82, for a waveform of WBP code symbol 86, are shown in FIG. 7.

Process 80 determines the best sample for WBP data detection in a two-phase process. In the first phase, called timing acquisition, process 80 selects (602) a subset of samples 82 centered at positive peaks of the servo preamble field. In this embodiment, process 80 selects three samples, although the invention is not limited as such.

Once the subset of samples is selected, process 80 moves (603) the sampling "window" in the time synchronization data by an amount equal to the over-sampling rate, e.g., by eight data samples. Process 80 selects a phase that is closest to positive peaks in the preamble, as described below. Process 80 also looks for a change in polarity of the peaks, i.e., the "0" symbol. Once the "0" has been identified process 80 knows that that point constitutes the start of the WBP data.

In one embodiment, the sampling phase is obtained using four filters. These four filters accumulate samples from four consecutive phases (1, 2, 3, 4) of the oversampled data to identify the largest magnitudes. One filter is assigned per phase. Each filter accumulates four samples and has a phase pair (n, n+4) associated with it. In this embodiment, the four phase pairs are (1,5), (2,6), (3,7), and (4,8). The filter with the highest output magnitude is identified. The "best" phase is either 'n' or 'n+4', depending on the polarity of that filter output. This phase is used for sampling. Once the phase is determined, process 80 starts the timing tracking phase.

In the timing tracking phase, process 80 oversamples (605) WBP data in the manner described above. Process 80 determines (606) whether the middle sample of the sampling "window" has the highest absolute value, i.e., if it corresponds to the peak of a WBP symbol. If so, process 80 moves (607) the sampling window by an equivalent of N samples and samples the WBP data at that peak. If the middle sample does not have the highest absolute value, process 80 moves (608) the sampling window by an equivalent of N±1 samples. For example, if the right sample of the three samples has the largest magnitude, this indicates that the sample was taken before the peak (e.g., samples 82$c$, 82$d$ and 82$e$). Accordingly, process 80 moves the sampling window the equivalent of N+1 samples in the data, whereafter process 80 samples the data at that location. On the other hand, if the left sample of the three samples has the largest magnitude (e.g., samples 82$f$, 82$g$ and 82$h$), this indicates that the sample was taken after the peak. Accordingly, process 80 moves (608) the sampling window the equivalent of N−1 samples in the data, whereafter process 80 samples the data at that location. The polarity of the sampled datum determines whether the WBP symbol equals "0" or "1". Once the WBP symbols are identified, process 80 decodes the detected WBP symbols to obtain track information.

Process 80 can be performed to asynchronously sample servo information and/or burst correction value (BCV) data on a data storage disk. Process 80, however, is not limited to use with servo and BCV data. Rather, it can be used to sample any type of data asynchronously from a data storage medium. Also, process 80 is not limited to use with PR4 and EPR4 data formats. Process 80 may be used with other data formats as well, such as NPR, which is a proprietary format used by Quantum Corp.

Hardware implementations are shown for process 80. Process 80, however, is not limited to use with any particular hardware or software configuration; it may find applicability in any computing or processing environment. All or part of process 80 may be implemented in hardware, software, or a combination of the two. All or part of process 80 may be implemented in one or more computer programs executing on programmable computers or other types of machines that each include a processor, a storage medium readable by the processor (including volatile and nonvolatile memory and/or storage elements), at least one input device, and one or more output devices. Program code may be applied to data entered using an input device to perform process 80 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 80. All or part of process 80 may be implemented as a computer-readable storage medium, configured with a computer program, where, upon execution, instructions in the computer program cause a computer to perform process 80.

Other embodiments not described herein are also within the scope of the following claims.

What is claimed is:

1. A method of sampling data that includes wide bi-phase code symbols, the method comprising:
   sampling a wide bi-phase code symbol in the data a number (N) of times to produce samples of data;
   selecting a subset of the samples;
   determining which sample in the subset of samples has a largest magnitude; and
   selecting a subset of samples in a subsequent wide bi-phase code symbol based on a sample in a previous subset that has the largest magnitude.

2. The method of claim 1, wherein the largest magnitude corresponds to a peak in the wide bi-phase code symbol.

3. The method of claim 1, wherein:
   the subset of samples includes three samples; and
   determining comprises identifying if a middle sample of the three samples has the largest magnitude.

4. The method of claim 3, wherein, if the middle sample does not have the largest magnitude, the method comprises:
   moving in the data an equivalent of N±1 samples; and
   sampling the subsequent wide bi-phase code symbol starting at a location corresponding to the equivalent of the N±1 samples.

5. The method of claim 1, wherein the data comprises servo information on a storage disk.

6. The method of claim 5, wherein the servo information identifies a track on the storage disk.

7. The method of claim 1, wherein the data comprises burst correction values stored on a storage disk.

8. The method of claim 7, wherein a burst correction value comprises an offset used in positioning a reading device on a track of the storage disk.

9. The method of claim 1, wherein wide bi-phase code comprises a code in which a zero is represented by data values comprising "++--" and a one is represented by data values comprising "--++".

10. The method of claim 1, wherein N is greater than four.

11. The method of claim 1, wherein N equals eight.

12. An apparatus comprising:
a controller which (i) selects a subset of the samples, (ii) determines which sample in the subset of samples has a largest magnitude, and (iii) samples a subsequent wide bi-phase code symbol in the data based on which sample in the subset of samples has the largest magnitude.

13. The apparatus of claim 12, wherein the largest magnitude corresponds to a peak in the wide bi-phase code symbol.

14. The apparatus of claim 12, further comprising:
a storage disk which stores data that includes the wide bi-phase code symbols;
wherein the wide bi-phase code symbol is sampled from the data stored on the storage disk.

15. The apparatus of claim 12, wherein the controller comprises a wide bi-phase symbol detector.

16. The apparatus of claim 12, wherein the apparatus is a disk drive.

17. The apparatus of claim 12, wherein:
the subset of samples includes three samples; and
identifying which sample in the subset of samples has a largest magnitude comprises determining if a middle sample of the three samples has the largest magnitude.

18. The apparatus of claim 17, wherein, if the middle sample does not have the largest magnitude, the controller:
moves in the data an equivalent of N±1 samples; and
samples the subsequent wide bi-phase code symbol starting at a location corresponding to the equivalent of the N±1 samples.

19. The apparatus of claim 12, wherein the data comprises servo information on a storage disk.

20. The apparatus of claim 19, wherein the servo information identifies a track on the storage disk.

21. The apparatus of claim 12, wherein the data comprises burst correction values stored on a storage disk.

22. The apparatus of claim 21, wherein a burst correction value comprises an offset used in positioning a reading device on a track of the storage disk.

23. The apparatus of claim 12, wherein wide bi-phase code comprises a code in which a zero is represented by data values comprising "++--" and a one is represented by data values comprising "--++".

24. The apparatus of claim 12, wherein N is greater than four.

25. The apparatus of claim 12, wherein N equals eight.

26. A computer-readable medium which stores executable instructions for sampling data that includes wide bi-phase code symbols, the instructions causing a processor to:
control a reading head to sample a wide bi-phase code symbol in the data a number (N) of times to produce samples of data;
select a subset of the samples;
determine which sample in the subset of samples has a largest magnitude; and
sample a subsequent wide bi-phase code symbol in the data based on which sample in the subset of samples has the largest magnitude.

27. The computer-readable medium of claim 26, wherein the largest magnitude corresponds to a peak in the wide bi-phase code symbol.

28. The computer-readable medium of claim 26, wherein:
the subset of samples includes three samples; and
determining comprises identifying if a middle sample of the three samples has the largest magnitude.

29. The computer-readable medium of claim 28, wherein, if the middle sample does not have the largest magnitude, the instructions cause the processor to:
move a sampling window in the data an equivalent of N±1 samples; and
sample the subsequent wide bi-phase code symbol starting at a location corresponding to the equivalent of the N±1 samples.

30. The computer-readable medium of claim 26, wherein the data comprises servo information on a storage disk.

31. The computer-readable medium of claim 30, wherein the servo information identifies a track on the storage disk.

32. The computer-readable medium of claim 26, wherein the data comprises burst correction values stored on a storage disk.

33. The computer-readable medium of claim 32, wherein a burst correction value comprises an offset used in positioning a reading device on a track of the storage disk.

34. The computer-readable medium of claim 26, wherein wide bi-phase code comprises a code in which a zero is represented by data values comprising "++--" and a one is represented by data values comprising "--++".

35. The computer-readable medium of claim 26, wherein N is greater than four.

36. The computer-readable medium of claim 26, wherein N equals eight.

37. An apparatus for sampling data that includes wide bi-phase code symbols, the apparatus comprising:
means for sampling a wide bi-phase code symbol in the data a number (N) of times to produce samples of data;
means for selecting a subset of the samples;
means for determining which sample in the subset of samples has a largest magnitude; and
means for selecting a subset of samples in a subsequent wide bi-phase code symbol based on a sample in a previous subset that has the largest magnitude.

* * * * *